US012557731B2

(12) United States Patent
Ojeda et al.

(10) Patent No.: US 12,557,731 B2
(45) Date of Patent: Feb. 24, 2026

(54) ELECTRIC LAWN MOWER WITH PIVOTING LEVER AND START SWITCH

(71) Applicant: Oso Technologies, LLC, Irving, TX (US)

(72) Inventors: Carlos Ojeda, Irving, TX (US); Nagaraj Rao, Irving, TX (US)

(73) Assignee: Oso Technologies, LLC, Irving, TX (US)

( * ) Notice: Subject to any disclaimer, the term of this patent is extended or adjusted under 35 U.S.C. 154(b) by 478 days.

(21) Appl. No.: 18/176,894

(22) Filed: Mar. 1, 2023

(65) Prior Publication Data
US 2023/0380341 A1 Nov. 30, 2023

Related U.S. Application Data

(60) Provisional application No. 63/345,530, filed on May 25, 2022.

(51) Int. Cl.
*A01D 34/78* (2006.01)
*A01D 34/68* (2006.01)
(Continued)

(52) U.S. Cl.
CPC ...... *A01D 34/78* (2013.01); *A01D 2034/6843* (2013.01); *A01D 2101/00* (2013.01)

(58) Field of Classification Search
CPC ................ A01D 75/18; A01D 34/6812; A01D 34/6818; A01D 34/69; A01D 34/68;
(Continued)

(56) References Cited

U.S. PATENT DOCUMENTS

| 4,428,180 A | * | 1/1984 | Carlson | .............. A01D 34/6806 |
| | | | | 56/10.8 |
| 5,195,307 A | * | 3/1993 | Thorud | .............. A01D 34/6806 |
| | | | | 56/11.8 |

(Continued)

FOREIGN PATENT DOCUMENTS

| CN | 105909774 A | 8/2016 |
| CN | 110731162 A | 1/2020 |

(Continued)

OTHER PUBLICATIONS

Australian Examination Report; Application No. 2023248108; Sep. 12, 2024; 3 pages.

(Continued)

*Primary Examiner* — Adam J Behrens
(74) *Attorney, Agent, or Firm* — Conley Rose, P.C.; William H. Dietrich

(57) ABSTRACT

An electric lawn mower including a pivoting lever coupled to a stationary handle, a start switch, a cutting blade, electric wheel motors, and a controller in communication with the pivoting lever and the start switch. The controller is configured to keep the cutting blade and the electric wheel motors off when the pivoting lever is disposed anywhere from a fully disengaged position up to and including a first pivot angle and the start switch has not been activated, keep the electric wheel motors off and turn the cutting blade on when the pivoting lever is disposed at a second pivot angle and the start switch is activated, and turn the electric wheel motors on when the pivoting lever is transitioned from the second pivot angle to a third pivot angle after the cutting blade has been turned on.

17 Claims, 5 Drawing Sheets

(51) Int. Cl.
 *A01D 34/82*      (2006.01)
 *A01D 101/00*     (2006.01)

(58) Field of Classification Search
 CPC .. A01D 34/78; A01D 34/828; A01D 2101/00;
      A01D 69/02; A01D 69/08; A01D 69/10;
             A01D 2034/6843
 See application file for complete search history.

(56)       References Cited

U.S. PATENT DOCUMENTS

| | | | | |
|---|---|---|---|---|
| 5,203,147 | A * | 4/1993 | Long | H01H 9/06 |
| | | | | 56/10.1 |
| 6,082,083 | A * | 7/2000 | Stalpes | A01D 34/6806 |
| | | | | 56/11.1 |
| 9,538,699 | B1 * | 1/2017 | Bejcek | A01D 34/69 |
| 11,272,658 | B2 * | 3/2022 | Jiang | A01D 75/18 |
| 2003/0037524 | A1 * | 2/2003 | Iida | A01D 69/02 |
| | | | | 56/11.9 |
| 2007/0130899 | A1 * | 6/2007 | Osborne | A01D 34/824 |
| | | | | 56/10.8 |
| 2011/0000175 | A1 * | 1/2011 | Lahey | A01D 34/68 |
| | | | | 56/10.8 |
| 2013/0046448 | A1 | 2/2013 | Fan et al. | |
| 2013/0081500 | A1 * | 4/2013 | Helin | A01D 34/82 |
| | | | | 474/8 |
| 2016/0324065 | A1 * | 11/2016 | Smith | A01D 34/68 |
| 2018/0146617 | A1 * | 5/2018 | Oota | A01D 34/824 |
| 2019/0075726 | A1 | 3/2019 | White et al. | |
| 2020/0060091 | A1 | 2/2020 | Yamaoka et al. | |
| 2020/0107497 | A1 * | 4/2020 | Ferrell | A01D 34/824 |
| 2020/0375102 | A1 * | 12/2020 | Arendt | A01D 34/69 |
| 2021/0153427 | A1 * | 5/2021 | Tao | A01D 34/824 |
| 2022/0124982 | A1 | 4/2022 | Yamaoka et al. | |
| 2023/0049667 | A1 * | 2/2023 | Ertl | A01D 34/69 |
| 2023/0166603 | A1 * | 6/2023 | Takahashi | F16D 43/04 |
| | | | | 701/22 |
| 2023/0172101 | A1 * | 6/2023 | Lardieri | A01D 34/6812 |
| | | | | 56/10.8 |
| 2023/0210051 | A1 * | 7/2023 | Ro | A01D 34/006 |
| | | | | 56/10.5 |
| 2023/0284558 | A1 * | 9/2023 | Aldridge | A01D 69/02 |
| 2024/0349641 | A1 * | 10/2024 | Shaffer | A01D 34/6806 |

FOREIGN PATENT DOCUMENTS

| | | | | | |
|---|---|---|---|---|---|
| EP | 1106046 | A1 * | 6/2001 | ........ | A01D 34/6806 |
| GB | 2281374 | A * | 3/1995 | ........ | A01D 34/6812 |

OTHER PUBLICATIONS

PCT International Search Report and PCT Written Opinion of the International Searching Authority; Application No. PCT/US2023/063486; Jul. 11, 2023; 10 pages.

European Extended Search Report; Application No. 23812671.8; Aug. 5, 2025; 9 pages.

Chinese Office Action; Application No. 202380010835.2; Sep. 15, 2025; 22 pages.

\* cited by examiner

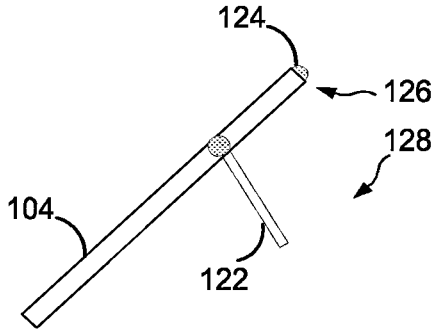
FIG. 2
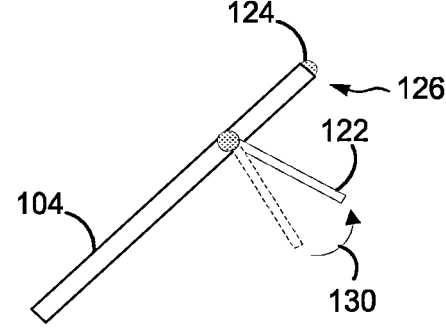
FIG. 3
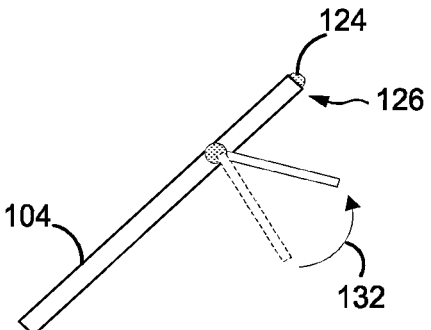
FIG. 4
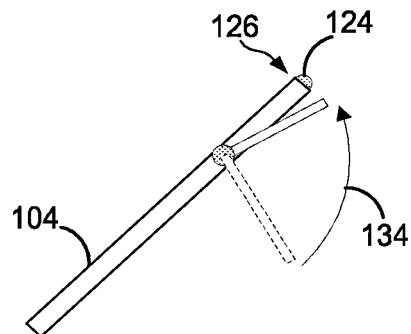
FIG. 5

600

700

| Keep a cutting blade and a self-propel drive mechanism off when a pivoting handle of the electric lawn mower is disposed anywhere from a fully disengaged position up to and including a first pivot angle and a safety switch of the electric lawn mower has not been activated | 702 |

| Keep the self-propel drive mechanism off and turn the cutting blade on when the pivoting handle is disposed at a second pivot angle and the safety switch is activated | 704 |

| Turn the self-propel drive mechanism on when the pivoting handle is transitioned from the second pivot angle to a third pivot angle after the cutting blade has been turned on | 706 |

FIG. 7

ELECTRIC LAWN MOWER WITH PIVOTING LEVER AND START SWITCH

CROSS-REFERENCE TO RELATED APPLICATIONS

This patent application claims the benefit of U.S. Provisional Patent Application No. 63/345,530 filed May 25, 2022, by Carlos Ojeda, et al., and titled "Mower," which is hereby incorporated by reference.

TECHNICAL FIELD

The present disclosure is generally related to electric lawn mowers, and is specifically related to an electric lawn mower with a pivoting lever and start switch.

BACKGROUND

A lawn mower (also known as a lawnmower, mower, or grass cutter) is a device utilizing one or more cutting blades (or a reel) to cut grass to an even height. While early lawn mowers relied on an operator to push them forward, many lawn mowers are now self-propelled by the same gas-powered internal combustion engine that powers the cutting blades.

Instead of using the gas-powered internal combustion engine, a growing number of lawn mowers are now equipped with one or more electric motors that power the cutting blades and propel the lawn mower forward. Relative to gas-powered lawn mowers, electric lawn mowers offer several benefits. For example, an electric lawn mower is much quieter and needs less maintenance than a gas-powered lawn mower. Moreover, the electric lawn mower is lighter and, thus, more maneuverable. Still further, the electric lawn mower is often less expensive and better for the environment.

SUMMARY

The disclosed aspects/embodiments provide an electric lawn mower with a pivoting lever and a start switch. The pivoting lever and start switch are configured such that the operator needs to use one hand to operate the pivoting lever while simultaneously activating (e.g., depressing) the start switch with the other hand in order to engage the electric lawn mower's cutting blades. Because both hands are occupied with a task when the cutting blades start, the probability of the operator being injured by the cutting blades is mitigated or eliminated. This makes for a much safer lawn mower compared to models that do not have such safety features.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is an illustration of a pivoting lever in a fully disengaged position according to an embodiment of the present disclosure.

FIG. 3 is an illustration of the pivoting lever disposed at a first pivot angle according to an embodiment of the present disclosure.

FIG. 4 is an illustration of the pivoting lever disposed at a second pivot angle according to an embodiment of the present disclosure.

FIG. 5 is an illustration of the pivoting lever disposed at a third pivot angle according to an embodiment of the present disclosure.

FIG. 7 is a method implemented by an electric lawn mower according to an embodiment of the present disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Conventional lawn mowers may include safety features such as, for example, blade guards. These blade guards are intended to protect an operator of the lawn mower from the lawn mower's cutting blades. Despite these safety features, injuries to an operator's hands, which can most easily get past the blade guards, still occur. These injuries can be severe, ranging from deep lacerations to amputation. Therefore, improvements to the safety systems of lawn mowers are still needed.

Disclosed herein is an electric lawn mower with a pivoting lever and a start switch. The pivoting lever and start switch are configured such that the operator needs to use one hand to operate the pivoting lever while simultaneously activating (e.g., depressing) the start switch with the other hand in order to engage the electric lawn mower's cutting blades. Because both hands are occupied with a task when the cutting blades start, the probability of the operator being injured by the cutting blades is mitigated or eliminated. This makes for a much safer lawn mower compared to models that do not have such safety features.

Figure 1:
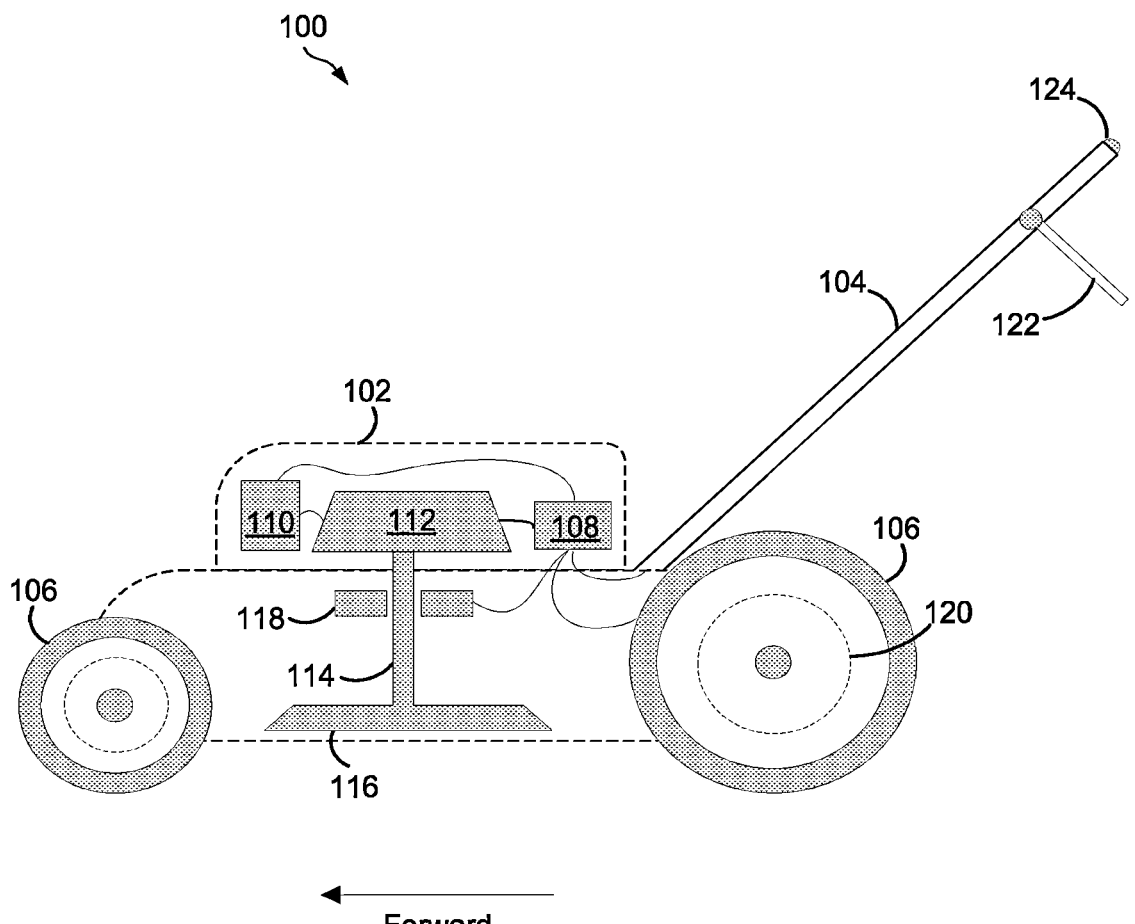
FIG. 1 is an illustration of an electric lawn mower according to an embodiment of the present disclosure.

FIG. 1 is an illustration of an electric lawn mower 100 according to an embodiment of the present disclosure. As shown, the electric lawn mower 100 comprises mower body 102, a stationary handle 104, a set of wheels 106, a controller 108, a battery 110, an electric motor 112, a drive shaft 114, a cutting blade 116, an electronic blade brake 118, electric wheel motors 120, a pivoting lever 122, and a start switch 124. One skilled in the art should appreciate that the electric lawn mower 100 may include various other components, parts, mechanisms, and features in practical applications that, for the sake of brevity, are not described herein.

The mower body 102 can be constructed from a variety of materials including metal, plastic, and so on. The mower body 102 may be constructed from one or more pieces bolted, riveted, welded, or otherwise fastened together. In an embodiment, the mower body 102 is light-weight, yet durable enough to withstand the rigors of repeated lawn maintenance. The mower body 102 may exhibit a particular color scheme or bear indicia (e.g., words, symbols, etc.) that identify the manufacturer of the electric lawn mower 100. As shown, the mower body 102 generally houses the controller 108, the battery 110, the electric motor 112, the drive shaft 114, the cutting blade 116, and the electronic blade brake 118.

The stationary handle 104 extends away from the mower body 102 and allows an operator of the electric lawn mower 100 to steer or maneuver the electric lawn mower 100 in a desired direction when cutting the grass of a lawn. In an embodiment, the stationary handle 104 is screwed or bolted to the mower body 102. In an embodiment, the stationary handle 104 is able to pivot relative to the mower body 102 and/or may fold for compact storage of the electric lawn mower 100.

In an embodiment, an angle of the stationary handle 104 is configured to relative to the mower body 102 to accommodate operators of different heights. In an embodiment, the stationary handle 104 is hollow so that wiring may be routed therethrough. In an embodiment, the stationary handle 104 supports wiring extending between the controller 108 and the pivoting lever 122 and wiring extending between the controller 108 and the start switch 124. The wiring may be routed in and through the stationary handle 104, or may be secured to an external surface of the stationary handle 104.

The wheels 106 may be formed from, for example, rubber, plastic, metal, or combinations thereof. The wheels 106 are generally attached to the mower body 102 via axles. Therefore, the wheels 106 permit the electric lawn mower 100 to roll, which allows the cutting blade 116 to pass over the lawn as the electric lawn mower 100 moves. In an embodiment, the wheels 106 are height-adjustable relative to the mower body 102. By moving the wheels 106 higher on the mower body 102, the cutting blade 116 is lowered to cut the grass shorter. In contrast, by moving the wheels 106 down on the mower body 102, the cutting blade 116 is raised to cut the grass longer.

In an embodiment, the wheels 106 include the electric wheel motors 120. The electric wheel motors 120 are configured to drive the wheels 106, thereby rotating the wheels 106 in a desired direction (e.g., clockwise or counter clockwise). In an embodiment, one or more of the electric wheel motors 120 are driven at a different speed than the other electric wheel motors 120 in order to steer (or help steer) the electric lawn mower 100. In an embodiment, the electric wheel motors 120 drive the wheels at a variable speed based upon a position of the pivoting lever 122 relative to the stationary handle 104, as will be more fully discussed below.

When engaged by the operator, the electric wheel motors 120 generally propel the electric lawn mower 100 in a forward direction (as shown by the arrow). By engaging the electric wheel motors 120, the operator of the electric lawn mower 100 does not have to apply substantial physical force to the stationary handle 104 in order to get the electric lawn mower 100 to move forward or backward.

The controller 108 is operably coupled to the battery 110, the electric motor 112, the electronic blade brake 118, the electric wheel motors 120, the pivoting lever 122, and the start switch 124. In an embodiment, the controller 108 is coupled to one or more of these components via a wired connection, a wireless connection, or some combination thereof. While the controller 108 is depicted being within the mower body 102, all or part of the controller 108 may be disposed in the stationary handle 104, the wheels 106, or elsewhere. In addition, while the controller 108 is depicted as a single component in FIG. 1, the controller 108 may be implemented as a plurality of discrete components, boards, or electronic elements dispersed throughout the electric lawn mower 100.

The controller 108 is able to monitor battery voltage, rate of battery charge, battery efficiency, battery life, a load (e.g., the load on the electric motor 112 due to the cutting blade 116 encountering grass), a current draw on the battery, or other parameters of the battery 110 via one or more sensors. The controller 108 is also able to signal the electric motor 112 to start or stop based on a signal received from the operator of the electric lawn mower 100. In addition, the controller 108 may signal the electric motor 112 to supply more or less power to the drive shaft 114, which in turn rotates the cutting blade faster or slower, respectively. For example, the controller 108 is able to slow the cutting blade 116 down to an eco-mode when no load is present (e.g., no grass is encountered by the cutting blade 116) or to maintain the cutting blade 116 at a high speed when the load is heavy (e.g., the grass is persistently present). In an embodiment, the controller 108 instructs the electric motor 112 to drive the cutting blade 116 at a maximum revolutions per minute (RPM) when the battery voltage has dropped below a predetermined threshold to compensate for loss of power and to extract as much energy from the battery 110 as possible. Further, the controller 108 is able to monitor the speed of the wheels 106 due to the electric wheel motors 120.

The controller 108 is also able to engage or disengage the electronic blade brake 118. When engaged, the electronic blade brake 118 prevents or inhibits the cutting blade 116 from rotating. When disengaged, the electronic blade brake 118 permits the cutting blade 116 to rotate freely under the power of the electric motor 112. The controller 108 is further able to monitor the load on the electric motor 112, which may indicate the rotational speed of the cutting blade 116.

In an embodiment, one end of the pivoting lever 122 is coupled to the stationary handle 104 via a pin or shaft so that the free end of the pivoting lever 122 is able to move either closer to, or further away from, a terminal end 126 of the stationary handle 104. As such, the pivoting lever 122 pivots relative to the stationary handle 104. In an embodiment, the controller 108 is able to determine the position of the pivoting lever 122 relative to the stationary handle 104 via one or more proximity sensors, latches, switches, optical sensors, or other sensing components in or on the electric lawn mower 100.

While the pivoting lever 122 is depicted as generally being below the stationary handle 104 in FIG. 1, the pivoting lever 122 may be otherwise oriented. For example, the pivoting lever 122 may be disposed above or next to the stationary handle 104. While the start switch 124 is depicted as being mounted proximate the end of the stationary handle 104, the start switch may be otherwise oriented. For example, the start switch 124 may be disposed one a side of the stationary handle 104, on a control panel mounted between parallel legs of the stationary handle 104, and so on.

In an embodiment, the controller 108 starts or stops the cutting blade 116 based on a signal received from the operator of the electric lawn mower 100. In an embodiment, the operator provides the signal by placing the pivoting lever 122 in a certain position relative to the stationary handle 104 and simultaneously manipulating the start switch 124, as will be more fully explained below. In an embodiment, the start switch 124 is manipulated by being depressed, pushed, flipped, engaged, clicked, or otherwise interacted with by the operator of electric lawn mower 100. In an embodiment, the start switch 124 may be a fingerprint reader that only permits the cutting blade 116 to be engaged when a fingerprint of the operator matches the fingerprint stored in the memory of the controller 108.

In an embodiment, the controller 108 includes a start switch array configured to receive the signal or signals generated when the operator of the electronic lawn mower 100 places the pivoting lever 122 in a certain position relative to the stationary handle 104 and simultaneously manipulates the start switch 124 to start the cutting blade 116. In an embodiment, the start switch array (a.k.a., relay) is a redundant, normally-open, passive electronic circuit.

In an embodiment, the electronic circuit utilizes the battery 110 for power. In an embodiment, the electronic circuit maintains the start switch array in a secure no voltage, no current state so that the electric motor 112 powering the cutting blade 116 cannot be accidentally or inadvertently started. That is, the electronic circuit normally interrupts the signal to the electric motor 112. In an embodiment, the electronic circuit is self-powered to maintain a signal to the electric motor 112 once the cutting blade is started 116. In an embodiment, the electronic circuit resets to the no voltage, no current state when the pivoting lever 122 is released.

In an embodiment, the electronic circuit is independent of other systems or electronic circuits in the electric lawn mower 100. In an embodiment, the electronic circuit is powered by a small, long lasting battery (not shown) independent of battery 110.

In an embodiment, the controller 108 starts or stops the electric wheel motors 120 based on a signal received from the operator of the electric lawn mower 100. In an embodiment, the operator provides the signal by manipulating the pivoting lever 122 into a certain position, as will be more fully explained below. In an embodiment, the operator provides the signal by manipulating the pivoting lever 122 into a certain position and placing a speed selector (e.g., a switch, a knob, etc.) in one of a plurality of available positions. Each position of the speed selector affects the speed range of the pivoting lever 122. For example, the higher the position of the speed selector, the higher the maximum speed, torque, power, climbing ability, etc., of the electric lawn mower 100 when the pivoting lever 122 is fully pivoted toward the stationary handle 104. In an embodiment, the electric wheel motors 120 are configured to propel the electric lawn mower 100 faster as the pivoting lever 122 pivots further toward the terminal end 126 of the stationary handle 104.

FIG. 2 is an illustration of the pivoting lever 122 in a fully disengaged position 128 according to an embodiment of the present disclosure. In the disengaged position 128, a free end of the pivoting lever 122 has pivoted or rotated about zero degrees (0°) toward the terminal end 126 of the stationary handle 104. In an embodiment, the pivoting lever 122 is normally biased into the fully disengaged position 128 by one or more springs or biasing members. In such an embodiment, the pivoting lever 122 has not been pivoted toward the terminal end 126 of the stationary handle 104 at all.

In an embodiment, the controller 108 is configured to keep the electronic blade brake 118 engaged when the pivoting lever is in the fully disengaged position 128. As such, the cutting blade 116 is prevented from rotating. In an embodiment, the controller 108 is configured to release the electronic blade brake 118 when the pivoting lever 122 leaves the fully disengaged position 128.

FIG. 3 is an illustration of the pivoting lever 122 disposed at a first pivot angle 130 according to an embodiment of the present disclosure. At the first pivot angle 130, a free end of the pivoting lever 122 has pivoted or rotated between about one degree (1°) and about forty-nine degrees (49°) toward the terminal end 126 of the stationary handle 104.

In an embodiment, the controller 108 is configured to keep the cutting blade 116 and the electric wheel motors 120 off (e.g., disengaged) when the pivoting lever 122 is disposed anywhere from the fully disengaged position 128 up to and including the first pivot angle 130 and the start switch 124 has not been activated.

FIG. 4 is an illustration of the pivoting lever 122 disposed at a second pivot angle 132 according to an embodiment of the present disclosure. At the second pivot angle 132, a free end of the pivoting lever 122 has pivoted or rotated about fifty degrees (50°) toward the terminal end 126 of the stationary handle 104.

In an embodiment, the controller 108 is configured to keep the electric wheel motors 120 off and turn the cutting blade 116 on when the pivoting lever 122 is disposed at the second pivot angle 132 and the start switch 124 is activated. That is, the controller 108 will only signal the cutting blade 116 to start when the pivoting lever 122 is at the second pivot angle 132 and the start switch 124 has been activated. If, however, the pivoting lever 122 is anywhere other than at the second pivot angle 132, the controller 108 will not start the cutting blade 116 when the start switch 124 has been activated.

In an embodiment, the start switch 124 is activated by being momentarily depressed. As used herein, momentarily depressed means depressed for about three seconds or less, or depressed for more than about one second but less than about three seconds.

In an embodiment, the pivoting lever 122 and the start switch 124 are configured such that the operator needs to use one hand to operate the pivoting lever 122 while simultaneously activating (e.g., depressing) the start switch 124 with the other hand in order to engage the cutting blade 116. For example, the pivoting lever 122 and the start switch 124 may be sufficiently spaced apart on the electric lawn mower 100 to ensure that each component must be operated simultaneously with one of the operator's two hands. Because both hands are occupied with a task when the cutting blade 116 starts, the probability of the operator being injured by the cutting blades is mitigated or eliminated. This makes for a much safer lawn mower compared to models that do not have such safety features.

In an embodiment, the controller 108 is configured to provide a signal to the operator of the electric lawn mower 100 to indicate that the pivoting lever 122 has achieved the second pivot angle 132, and that activation of the start switch 124 while the pivoting lever 122 remains at the second pivot angle 132 will turn on the cutting blade 116. In an embodiment, the signal is an audible signal, a visual signal, a tactile feedback signal, or combinations thereof. For example, the controller 108 can illuminate an indicator light, can emit a chirp or beep, and/or cause one or both of the stationary handle 104 and the pivoting lever 122 to gently vibrate when the pivoting lever 122 has reached the second pivot angle 132.

FIG. 5 is an illustration of the pivoting lever 122 disposed at a third pivot angle 134 according to an embodiment of the present disclosure. At the third pivot angle 134, a free end of the pivoting lever 122 has pivoted or rotated between about fifty-one degrees (51°) and about one hundred degrees (100°) toward the terminal end 126 of the stationary handle 104. In an embodiment, the pivoting lever 122 is substantially parallel with the stationary handle 104 and in the fully engaged position at one hundred degrees (100°).

In an embodiment, the controller 108 is configured to turn the electric wheel motors 120 on when the pivoting lever 122 is transitioned from the second pivot angle 132 to the third pivot angle 134 after the cutting blade 116 has been turned on. In an embodiment, the electric wheel motors 120 are configured to propel the electric lawn mower 100 faster as the pivoting lever 122 pivots further toward the terminal end 126 of the stationary handle 104 and/or depending on a position of the speed selector described above.

In an embodiment, the controller 108 is configured to turn the electric wheel motors 120 on and keep the cutting blade 116 off when the pivoting lever 122 has achieved the third pivot angle 134 and the start switch 134 has not been activated. This allows the electric lawn mower 100 to be propelled forward without the cutting blade 116 being turned on.

In an embodiment, the controller 108 is configured to turn off the electric wheel motors 120 and the cutting blade 116 when the pivoting lever 122 is returned to the fully disengaged position 128 from the first pivot angle 130, the second pivot angle 132, or the third pivot angle 134.

Figure 6:
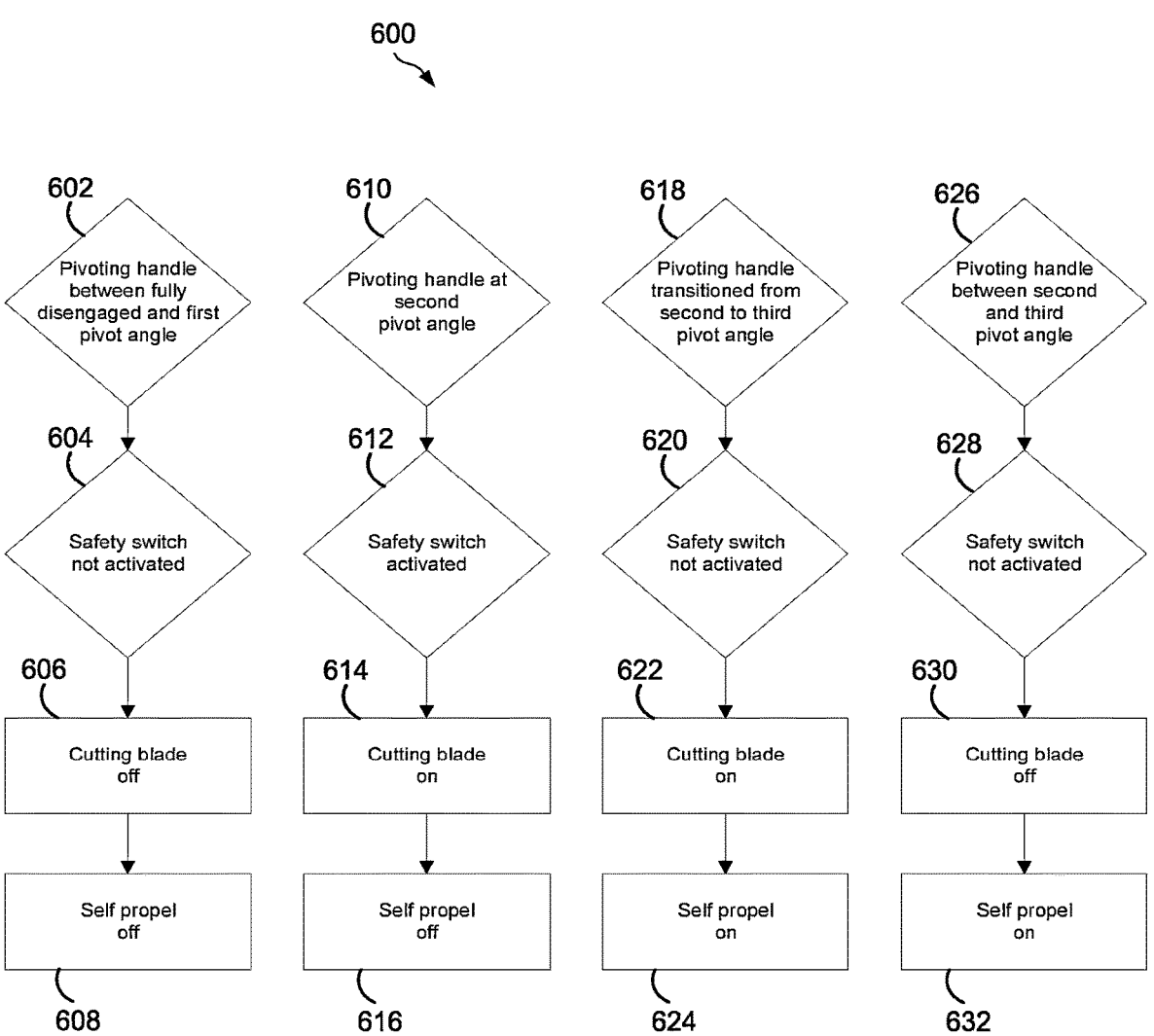
FIG. 6 is a chart illustrating operation of the electric lawn mower using the pivoting lever and the start switch according to an embodiment of the present disclosure.

FIG. 6 is a chart 600 illustrating operation of the electric lawn mower 100 using the pivoting lever 122 and the start switch 124 according to an embodiment of the present disclosure. As shown, when the pivoting lever 122 is disposed anywhere from the fully disengaged position 128 up to and including the first pivot angle 130 (block 602) and the start switch 124 has not been activated (block 604), the cutting blade 116 is kept off (block 606) and the electric wheel motors 120 are kept off (block 608).

When the pivoting lever 122 is at the second pivot angle 132 (block 610) and the start switch 124 is activated (block 612), the cutting blade 116 is turned on (block 614) and the electric wheel motors 120 are kept off (block 616).

When the pivoting lever 122 is transitioned from the second pivot angle 132 to the third pivot angle 134 (block 618) after the cutting blade 116 has been turned on (block 614), the electric wheel motors 120 are turned on (block 624). Here, the start switch 124 need not be activated (block 620) since the cutting blade 116 is still on (block 622). In an embodiment, the transition from the second pivot angle 132 to the third pivot angle 134 must be part of a continuous action. That is, the pivoting lever 122 must progress toward the third pivot angle 134 without moving back toward the first pivot angle 130. Should the pivoting lever 122 move back toward the first pivot angle 130 after the cutting blade 116 has been turned on, the cutting blade 116 is disengaged and the electric wheel motors 120 remains off When the pivoting lever 122 is transitioned from the second pivot angle 132 to the third pivot angle 134 (block 626) without the start switch 124 having been timely activated (block 628) to start the cutting blade 116 as described above, the cutting blade 116 is kept off (block 630) and the electric wheel motors 120 are turned on (block 632).

FIG. 7 is a method 700 implemented by an electric lawn mower (e.g., the electric lawn mower 100 of FIG. 1) according to an embodiment of the present disclosure. The method 700 may be performed by an operator of the electric lawn mower 100 in order to cut, for example, the grass of a lawn.

In block 702, the electric lawn mower 100 keeps a cutting blade 116 and electric wheel motors 120 off when a pivoting lever 122 of the electric lawn mower 100 is disposed anywhere from the fully disengaged position 128 up to and including a first pivot angle 130 and the start switch 124 of the electric lawn mower 124 has not been activated.

In block 704, the electric lawn mower 100 keeps the electric wheel motors 120 off and turns the cutting blade 116 on when the pivoting lever 122 is disposed at a second pivot angle 132 and the start switch 124 is activated.

In block 706, the electric lawn mower 100 turns the electric wheel motors 120 on when the pivoting lever 122 is transitioned from the second pivot angle 132 to a third pivot angle 134 after the cutting blade 116 has been turned on.

In an embodiment, the method 700 further comprises turning off the electric wheel motors 120 and the cutting blade 116 when the pivoting lever 122 is returned to the fully disengaged position 128. In an embodiment, the method 700 further comprises keeping the cutting blade 116 and the electric wheel motors 120 off when the start switch 124 is activated and the pivoting lever 122 is anywhere other than at the second pivot angle 132. In an embodiment, the method 700 further comprises turning the electric wheel motors 120 on and keeping the cutting blade 116 off when the pivoting lever 122 has achieved the third pivot angle 134 and the start switch 124 has not been activated.

Figure 8:
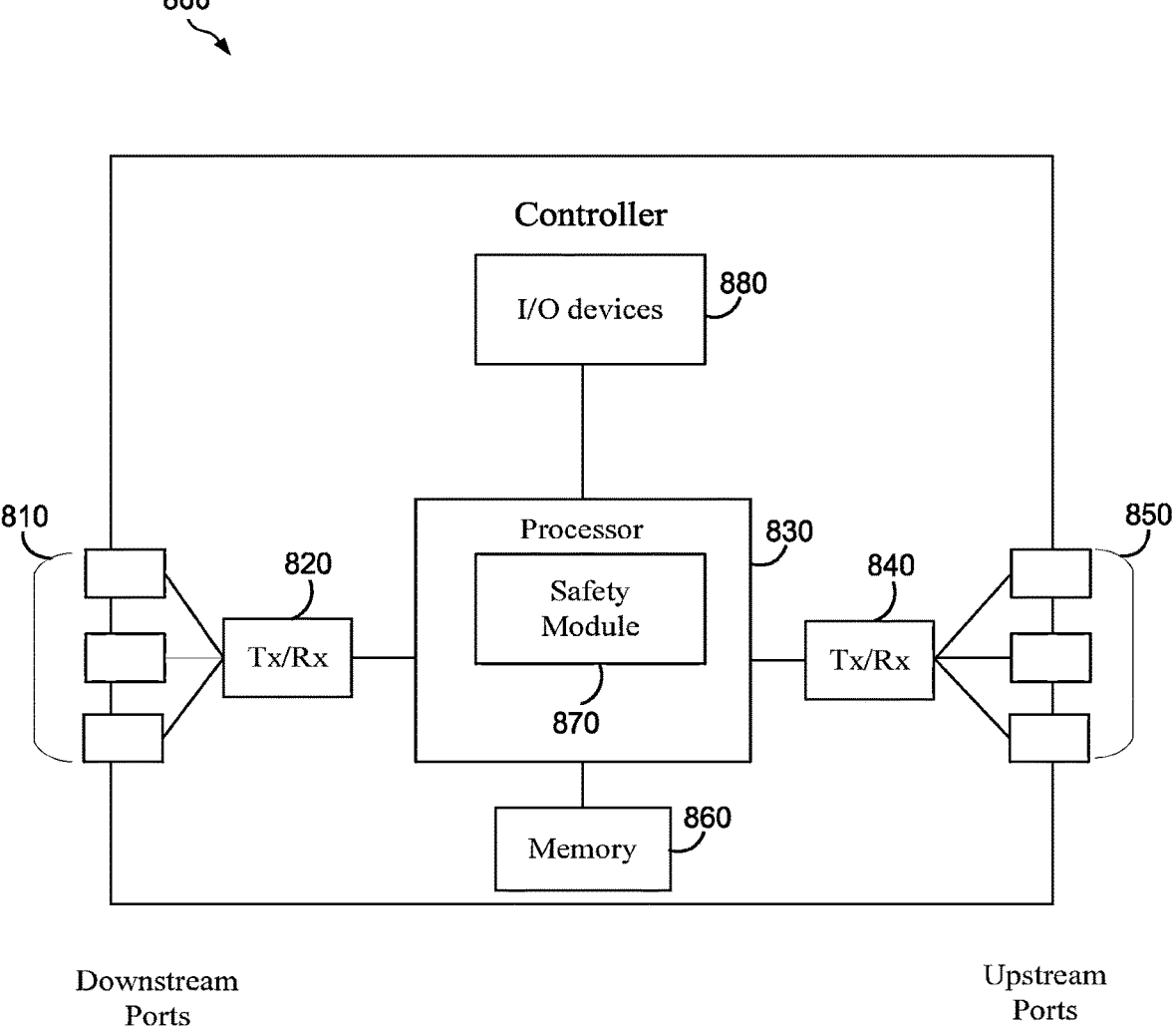
FIG. 8 is a schematic diagram of a computing device according to an embodiment of the disclosure.

FIG. 8 is a schematic diagram of a computing device 800 (e.g., controller 108) according to an embodiment of the disclosure. The computing device 800 is suitable for implementing the disclosed embodiments as described herein. The computing device 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The computing device 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a safety module 870. The safety module 870 is able to implement one or more of the embodiments or actions described above. For instance, the safety module 870 implements, processes, prepares, or provides the various functions disclosed herein. The inclusion of the safety module 870 therefore provides a substantial improvement to the functionality of the computing device 800 and effects a transformation of the computing device 800 to a different state. Alternatively, the safety module 870 is implemented as a computer program product comprising instructions stored in the memory 860 and executed by the processor 830.

The computing device 800 may also include input and/or output (I/O) devices 880 for communicating data to and from a user, and for receiving input from and providing output to a network administrator. The I/O devices 880 may include output devices such as a display for displaying video data, speakers for outputting audio data, etc. The I/O devices 880 may also include input devices, such as a keyboard, mouse, trackball, sensors, etc., and/or corresponding interfaces for interacting with such output devices.

The memory 860 comprises one or more disks, tape drives, and solid-state drives and may be used as an over-flow data storage device, to store programs when such programs are selected for execution, and to store instructions and data that are read during program execution. The memory 860 may be volatile and/or non-volatile and may be read-only memory (ROM), random access memory (RAM), ternary content-addressable memory (TCAM), and/or static random-access memory (SRAM).

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. An electric lawn mower, comprising:
a pivoting lever coupled to a stationary handle;
a start switch;
a cutting blade;
electric wheel motors; and
a controller in communication with the pivoting lever, the start switch, the cutting blade, and the electric wheel motors, wherein the controller is configured to:
keep the cutting blade and the electric wheel motors off when the pivoting lever is disposed anywhere from a fully disengaged position up to and including a first pivot angle and the start switch has not been activated;
keep the electric wheel motors off and turn the cutting blade on when the pivoting lever is disposed at a second pivot angle and the start switch is activated;
turn the electric wheel motors on when the pivoting lever is transitioned from the second pivot angle to a third pivot angle after the cutting blade has been turned on; and
provide a signal to an operator of the electric lawn mower to indicate that the pivoting lever has achieved the second pivot angle and that activation of the start switch while the pivoting lever remains at the second pivot angle will turn on the cutting blade.

2. The electric lawn mower of claim 1, wherein the controller is configured to release an electronic blade brake when the pivoting lever leaves the fully disengaged position.

3. The electric lawn mower of claim 1, wherein the controller is configured to turn off the electric wheel motors and the cutting blade when the pivoting lever is returned to the fully disengaged position.

4. The electric lawn mower of claim 1, wherein the controller is configured to keep the cutting blade and the electric wheel motors off when the start switch is activated and the pivoting lever is anywhere other than at the second pivot angle.

5. The electric lawn mower of claim 1, wherein the controller is configured to turn the electric wheel motors on and keep the cutting blade off when the pivoting lever has achieved the third pivot angle and the start switch has not been activated.

6. The electric lawn mower of claim 1, wherein the start switch is activated by being momentarily depressed.

7. The electric lawn mower of claim 1, wherein the controller is configured to engage an electronic blade brake when the pivoting lever has returned to the fully disengaged position.

8. The electric lawn mower of claim 1, wherein the fully disengaged position, the first pivot angle, the second pivot angle, and the third pivot angle of the pivoting lever are all determined relative to the stationary handle, and wherein the fully disengaged position is about zero degrees (0°), the first pivot angle is between about one degree (1°) and about forty-nine degrees (49°), the second pivot angle is about fifty degrees (50°), and the third pivot angle is between about fifty-one degrees (51°) and about one hundred degrees (100°).

9. The electric lawn mower of claim 1, wherein the electric wheel motors is configured to propel the electric lawn mower faster as the pivoting lever pivots further toward the stationary handle.

10. A method implemented by an electric lawn mower, comprising:
keeping a cutting blade and electric wheel motors off when a pivoting lever of the electric lawn mower is disposed anywhere from a fully disengaged position up to and including a first pivot angle and a start switch of the electric lawn mower has not been activated;
keeping the electric wheel motors off and turning the cutting blade on when the pivoting lever is disposed at a second pivot angle and the start switch is activated;
turning the electric wheel motors on when the pivoting lever is transitioned from the second pivot angle to a third pivot angle after the cutting blade has been turned on; and
providing a signal to an operator of the electric lawn mower to indicate that the pivoting lever has achieved the second pivot angle and that activation of the start switch while the pivoting lever remains at the second pivot angle will turn on the cutting blade.

11. The method of claim 10, wherein the method further comprises turning off the electric wheel motors and the cutting blade when the pivoting lever is returned to the fully disengaged position.

12. The method of claim 10, wherein the method further comprises keeping the cutting blade and the electric wheel motors off when the start switch is activated and the pivoting lever is anywhere other than at the second pivot angle.

13. The method of claim 10, wherein the method further comprises turning the electric wheel motors on and keeping the cutting blade off when the pivoting lever has achieved the third pivot angle and the start switch has not been activated.

14. A computer program product comprising instructions stored on a non-transitory computer-readable medium that, when executed by a processor, cause an electric lawn mower to:
keep a cutting blade and electric wheel motors off when a pivoting lever is disposed anywhere from a fully disengaged position up to and including a first pivot angle and a start switch has not been activated;
keep the electric wheel motors off and turn the cutting blade on when the pivoting lever is disposed at a second pivot angle and the start switch is activated;

turn the electric wheel motors on when the pivoting lever is transitioned from the second pivot angle to a third pivot angle after the cutting blade has been turned on; and provide a signal to an operator of the electric lawn mower to indicate that the pivoting lever has achieved the second pivot angle and that activation of the start switch while the pivoting lever remains at the second pivot angle will turn on the cutting blade.

15. The computer program product of claim 14, wherein the instructions further cause the electric lawn mower to turn off the electric wheel motors and the cutting blade when the pivoting lever is returned to the fully disengaged position.

16. The computer program product of claim 14, wherein the instructions further cause the electric lawn mower to keep the cutting blade and the electric wheel motors off when the start switch is activated and the pivoting lever is anywhere other than at the second pivot angle.

17. The computer program product of claim 14, wherein the instructions further cause the electric lawn mower to turn the electric wheel motors on and keep the cutting blade off when the pivoting lever has achieved the third pivot angle and the start switch has not been activated.

\* \* \* \* \*